United States Patent
Gremaud (10) Patent No.: US 12,425,204 B2
(45) Date of Patent: Sep. 23, 2025

(54) SECURED COMMUNICATION BETWEEN A DEVICE AND A REMOTE SERVER

(71) Applicant: NAGRAVISION SARL, Cheseaux-sur-Lausanne (CH)

(72) Inventor: Fabien Gremaud, Cheseaux-sur-Lausanne (CH)

(73) Assignee: NAGRAVISION SARL, Cheseaux-sur-Lausanne (CH)

( * ) Notice: Subject to any disclaimer, the term of this patent is extended or adjusted under 35 U.S.C. 154(b) by 256 days.

(21) Appl. No.: 17/759,791

(22) PCT Filed: Jan. 29, 2021

(86) PCT No.: PCT/EP2021/052160
§ 371 (c)(1),
(2) Date: Jul. 29, 2022

(87) PCT Pub. No.: WO2021/152127
PCT Pub. Date: Aug. 5, 2021

(65) Prior Publication Data
US 2023/0064441 A1 Mar. 2, 2023

(30) Foreign Application Priority Data
Jan. 31, 2020 (EP) .................................... 20154820

(51) Int. Cl.
*H04L 9/08* (2006.01)
*H04L 9/32* (2006.01)

(52) U.S. Cl.
CPC .......... *H04L 9/0866* (2013.01); *H04L 9/0825* (2013.01); *H04L 9/3242* (2013.01); *H04L 9/3263* (2013.01)

(58) Field of Classification Search
CPC ... H04L 9/0866; H04L 9/0825; H04L 9/3242; H04L 9/3263; H04L 63/061
See application file for complete search history.

(56) References Cited

U.S. PATENT DOCUMENTS 11,290,279 B2 * 3/2022 Yoon ...................... H04W 12/06
2003/0220096 A1 * 11/2003 Smeets ............... H04W 12/126
455/410

(Continued)

FOREIGN PATENT DOCUMENTS

| EP | 2 547 050 A1 | 1/2013 |
| JP | 2007-323568 A | 12/2007 |
| WO | WO 2018/011078 A1 | 1/2018 |

OTHER PUBLICATIONS

International Search Report & Written Opinion issued Mar. 3, 2021 in PCT/EP2021/052160, filed on Jan. 29, 2021, 13 pages.

(Continued)

*Primary Examiner* — William R Korzuch
*Assistant Examiner* — Matthias Habtegeorgis
(74) *Attorney, Agent, or Firm* — Oblon, McClelland, Maier &Neustadt, L.L.P.

(57) ABSTRACT

A method for securing a communication between a remote server and a device equipped with a secure element, device side profile data being stored in the device, and device side secure element data being stored in the secure element. The image data includes server side profile data being stored in the remote server, server side secure element data being stored in the remote server, or being retrievable from the remote server. The method includes associating the device with the secure element, generating, on the device side, a device key material, reporting the association to the remote server, generating, on the remote server side, a server key material, authorizing a communication between the device and the remote server, after an authentication based at least on the basis of a comparison between the device key material and the server key material.

19 Claims, 5 Drawing Sheets

(56) References Cited

U.S. PATENT DOCUMENTS

| | | | |
|---|---|---|---|
| 2012/0331298 A1 | 12/2012 | Xu et al. | |
| 2014/0315574 A1* | 10/2014 | Shakespeare | H04W 64/00 |
| | | | 455/456.1 |
| 2015/0229477 A1* | 8/2015 | Blair | H04L 9/3228 |
| | | | 713/156 |
| 2015/0294515 A1* | 10/2015 | Bergdale | H04W 4/80 |
| | | | 340/5.61 |
| 2016/0012655 A1* | 1/2016 | Hanson | H04W 4/029 |
| | | | 340/5.61 |
| 2016/0174069 A1* | 6/2016 | Bruner | H04L 63/065 |
| | | | 455/411 |
| 2018/0048647 A1* | 2/2018 | Favila | H04L 67/10 |
| 2018/0123782 A1* | 5/2018 | Messerges | H04L 51/04 |
| 2019/0289463 A1* | 9/2019 | Glouche | G06F 21/43 |
| 2020/0267549 A1* | 8/2020 | Arkko | H04W 12/06 |
| 2021/0185042 A1* | 6/2021 | Sharma | H04L 67/146 |
| 2024/0171569 A1* | 5/2024 | Sanchez | H04W 12/069 |

OTHER PUBLICATIONS

Extended European Search Report issued May 19, 2020 in European Application 20154820.3, filed on Jan. 31, 2020, 8 pages.
Office Action issued Jan. 7, 2025, in corresponding Japanese Patent Application No. 2022-546717 with English translation, 8 pages.

* cited by examiner

SECURED COMMUNICATION BETWEEN A DEVICE AND A REMOTE SERVER

The present invention relates to the internet of things (IoT), where devices (interrelated computing devices, mechanical and digital machines, objects) are provided with unique identifiers (UIDs) to have the ability to transfer data over a network without requiring human-to-human or human-to-computer interaction. In this context, it is known to equip a device (an object with communication and computing capacity) with a secure element (either in the form of a system on chip (SOC), in the form of embedded universal integrated circuit card (ieUICC), Secure Enclave, Trusted Execution Environment or in the form of an embedded secure element), which implements a root of trust (RoT) to make use of root secrets. In other words, the secure element can be a SIM or an eSIM discrete chip but can also be integrated into the SoC of the device, (ieUICC or SoC secure enclave).

However, the secure element usually needs to be securely personalized with a specific identity and profile of the device. The device unique profile needs to be associated and secured by the secure element to prevent:
  Copy of the device profile in other device(s), (clone of the legit device);
  Copy of a device profile in different device(s), (emulation of the legit device);
  Release/disclosure of the secrets of a device profile (attack the legit device, e.g. observe a user/device communication).

Different solutions are designed and implemented to solve the above issue, especially when the profile is installed in a non trusted and/or within non secured environment, for example:
  Pre-association: the device profile is "pre-encrypted" using a secure element RoT secret as a service. The pre-encrypted device profiles are then provided to the device supply chain for being programmed. However, the issue there is that the service needs to pre-encrypt the device image with all possible RoT secret or force the supply chain to select or pair the secure element to be programmed.
  Post-association: the device profile is encrypted for a production Hardware Security Module (HSM) located in the device supply chain. The production of Hardware Security Module (HSM) is then dynamically associated/encrypted with the device image using the secure element RoT secret. However, the issue there is that the Hardware Security Module (HSM) needs to installed/maintained and requires a specific dynamic interaction with the device during the production.

Pre-association and post-association also fail in easily associate multiple devices profiles in case of the secure element needs to program multiple independent sources.

Another type of solution is possible, the "verified-association", which basically consists in verifying that the association is valid in a system using typically production logs. This solution has the minimum impact on the supply chain. Two options are possible:
  Verified association with default activation: the association is by default considered valid and may be later invalidated by the system in case of duplication.
  Verified association with explicit activation: the association needs to be validated prior activation.

The problem with the verified association is:
  Verified association with default activation: a monitoring system needs to be setup and would have to rule the conflict. Moreover, a "bad" association may be validated until it is finally detected by the system.
  Verified association with explicit activation: needs a connection or a valid logging system to validate the association before the device is "functional". This impacts the supply chain by forcing a robust logging system or adds strong limitation to the device if done after the device is produced.

In summary, when:
  a given secure element (which implements a root of trust (RoT)) is manufactured at a secure element manufacturing location,
  and sent to a device manufacturer to be associated to a given device at a device manufacturing location,
  for communicating to a remote server belonging to a service provider, there is the need to ensure a secure communication between the device and the remote server, without having to do pre- or post-association, pairing or dynamically linking the two supply chains of the secure element manufacturer and the device manufacturer, and/or the remote server belonging to the service provider.

Document WO2018011078A1 discloses a method and system for dual-network authentication of a communication device communicating with a server. In this document, a device can comprise a secure element (a SIM card) for generating a response sent to a remote server. However, manufacturing of the device in must then be done using a fully secured environment to ensure security of private data.

Document EP2547050A1 discloses an authentication method, equipment and system. However, this document discloses Authentication and Key Agreement steps (typically challenge-response or one time password) preliminary to any authorized communication.

The present invention aims to address the above mentioned drawbacks of the prior art, and to propose first a method for securing a communication between a remote server and a device equipped with a secure element, to allow an easy manufacturing the of the device and of the secure element without having to do pre- or post-association, pairing or dynamically linking the two supply chains, and to still enable a secured communication with a strong authentication.

In this aim, a first aspect of the disclosure relates to a method for securing a communication between a remote server and a device equipped with a secure element,
  device side profile data being stored in the device and/or in the secure element,
  device side secure element data being stored in the secure element,
  image data comprising:
    server side profile data being stored in the remote server,
    server side secure element data being stored in the remote server, or being retrievable from the remote server,
the method comprising the steps of:
  a- associating the device with the secure element,
  b- generating, on the device side, a device key material based on the device side profile data and the device side secure element data,
  c- reporting the association to the remote server,
  d- generating, on the remote server side, a server key material based on the server side profile data and the server side secure element data, retrieved from the image data from the reported association, e- authorizing a communication between the device and the remote server, after an authentication based at least on the basis of a comparison between the device key material and the server key material.

According to the above embodiment, the method comprises a step of reporting an association. This step is executed after association or coupling of the device and secure element. A device key material is generated or computed on the device side with data from the profile data and data from the secure element, so that the device key material is an image of the association (performed for example by the device manufacturer or directly by a user). After the association is reported to the remote server, data related to the specific secure element and profile data are retrieved from the image data which is stored into the remote server, so that a server key material can be generated or computed, the server key material being also an image of the association. Consequently, the device key material is computed from data available on the device side, before association, and the server key material is computed from data available on the server side, before association. The most important is that the device key material and server key material are both computed to be an image of the association, but with at least a piece of data which is not part of the message reporting the association. Therefore, the confidentiality of the message reporting the association is not critical for ensuring the security of the authentication step. In particular, even if the reporting message is intercepted of falsified by a third party, the security of authentication will not be jeopardized, as either the device key material or server key material will be different in case the third party manages to corrupt the association message, or the third party will not be able to compute the device key material or server key material as a part of the input for computation is not available into the association reporting.

According to an embodiment:
the device side profile data comprising device side profile public data and the device side secure element data comprising device side secure element public data,
wherein the step c- of reporting the association to the remote server consists in a step of sending readable association data, the readable association data comprising:
at least a part of the device side profile public data, such as: profile public ID, and/or profile public key, and/or profile public certificate, and
at least a part of the device side secure element public data such as: secure element public ID, and/or secure element public key, and/or secure element public key certificate. According to the above embodiment, only public data is part of the reporting message sent from the device side (typically the device manufacturer or a user, after they associate the given device to the given secure element) to the remote server. In particular, there is neither private data nor secret data into the reporting message sent from the device side to the remote server, so that security and procedures to send the message reporting the association does not need to be of high level of security. Typically, if reporting the association is done during the device manufacturing process, there is no need for constant dynamic reciprocal and secure connection.

According to an embodiment:
the device side profile data comprising a profile public key,
the device side secure element data comprising a secure element private key, the step d- comprises, after the step c- of reporting the association to the remote server:
a step d1- of sending a request from the remote server to a public key infrastructure to authenticate the data related to the secure element received at step c- or establishing a connection between the remove server and a Public Key Infrastructure, or sending a request from the remote server to a Public Key Management Authority to retrieve a secure element public key and/or a secure element public key certificate related to the data related to the secure element received at step c-,
a step d2- of receiving an authentication of the data related to the secure element from the Public Key Infrastructure or retrieving and storing into the remote server from the Public Key Management Authority, a secure element public key and/or a secure element public key certificate. According to the above embodiment, the communication scheme is simplified as the remote server simply needs to recover authentication or the secure element public key or the secure element public key certificate from a Public Key Infrastructure (PKI), which might be done with no specific burden, in contrast to an overall process where the secure element manufacturer has to deliver the secure element to a device manufacturer, and to send in a secure manner the secure element secret or private data to the remote server belonging to a service provider. Public Key Management Authority can typically store in secure conditions all device or secure element public keys and distribute to trusted partners, such as the operator.

According to an embodiment:
the server side profile data comprising a profile private key,
wherein:
the device key material is a device shared secret computed at the step b- with the profile public key and the secure element private key,
the server key material is a server shared secret generated at the step d- with the profile private key stored on server side and the secure element public key and/or the secure element public key certificate retrieved at step d2-. According to the above embodiment based on asymmetric cryptography, both the secure element and the remote server store a public key of the other entity and their respective private key. Therefore, the key material computed on both sides is reliable and cannot be computed by another party.

In other words, in case of asymmetric based system, the disclosure relates to a method for securing a communication between a remote server and a device equipped with a secure element,
device side profile data (comprising a profile public key or certificate of a first asymmetric cryptographic system related to the remote server) being stored in the device and/or in the secure element,
device side secure element data (comprising a secure element private key and a secure element public key or certificate of a second asymmetric cryptographic system related to the secure element) being stored in the secure element,
image data comprising:
server side profile data (comprising a profile private key of the first asymmetric cryptographic system related to the remote server) being stored in the remote server,
server side secure element data (comprising a secure element public key or certificate of the second asymmetric cryptographic system related to the secure element) being stored in the remote server, or being retrievable from the remote server, the method comprising the steps of:
- a- associating the device with the secure element,
- b- generating, on the device side, a device key material based on the device side profile data (the profile public key of the first asymmetric cryptographic system) and the device side secure element data (the secure element private key of a second asymmetric cryptographic system),
- c- reporting the association to the remote server (by sending the profile public key of the first asymmetric cryptographic system, and the secure element public key or certificate of the second asymmetric cryptographic system)
- d- generating, on the remote server side, a server key material based on the server side profile data (the profile private key of the first asymmetric cryptographic system) and the server side secure element data (the secure element public key or certificate of the second asymmetric cryptographic system), retrieved from or out of the image data from the reported association,
- e- authorizing a communication between the device and the remote server, after an authentication based at least on the basis of a comparison between the device key material and the server key material.

According to an embodiment:
step a- comprises, after associating the device with the secure element, a step a'1- of generating or installing device manufacturer data and storing said device manufacturer data into device,
step b- comprises:
  a step b'1 of computing at least one device shared secret taking as input the secure element private key, the profile public key and the device manufacturer data generated at step a'1,
  step c- of reporting the association includes a step c'1 of reporting the device manufacturer data, while the device shared secret remains stored in the device as the device key material,
step d- comprises a step d'1 of computing the server key material based on the device manufacturer data received at step c'1, the profile private key, the secure element public key and/or the secure element public key certificate. Taking advantage of the asymmetric cryptography, some data can be generated and encrypted on the device side. The data generated at the device side can be sent to the remote server simultaneously to the reporting of the association for being included in the server key material as well. If for example the generated data is related to a chosen service or a personalization, the remote server can directly propose a specific service or personalization in response.

According to one embodiment, multiple keys can be generated from the association and different type of device manufacturer data (triple association between secure element, operator profile and manufacturer data).

According to an embodiment, the step b'1 carries out a Key Derivation Function (KDF) to compute the device shared secret.

According to an embodiment, the step d'1 carries out a Key Derivation Function (KDF) to compute the server key material.

According to an embodiment:
step a- comprises, after associating the device with the secure element, a step a"1- of generating device manufacturer data and storing said device manufacturer data into device,
step b- comprises
  a step b"1 of computing the device shared secret and
  a step b"2 of computing a verification token taking as input the device shared secret computed at step b"1 and the device manufacturer data generated at step a"1,
step c- of reporting the association includes a step c"1 of reporting the verification token, while the device shared secret remains stored in the device. Taking advantage of the asymmetric cryptography, some data can be generated and used on the device side to generate a verification token to be sent to the remote server simultaneously to the reporting of the association.

According to an embodiment, the system comprises at least a first remote server storing a first profile private key and a second remote server storing a second profile private key,
the device (or secure element) storing a first profile public key related to the first profile private key, and a second profile public key related to the second profile private key, and:
  the step b- comprises a step b10- of generating a first device key material based on the secure element private key and the first profile public key and a step b20- of generating a second device key material based on the secure element private key and the second profile public key,
  the step c- comprises a step c10- of reporting to the first remote server the association of secure element to the first profile public key, and a step c20- of reporting to the second remote server the association of secure element to the second profile public key,
  the step d- comprises a step d10- of generating by the first remote server a first server key material based on the secure element public key and the first profile private key and a step d20- of generating by the second remote server a second server key material based on the secure element public key and the second profile private key,
  the step e- comprises a step e10- of authorizing a communication between the device and the first remote server, after an authentication based at least on the basis of a comparison between the first device key material and the first server key material and/or a step e20- of authorizing a communication between the device and the second remote server, after an authentication based at least on the basis of a comparison between the second device key material and the second server key material. According to the above embodiment, there is no risk or mixing the data or communication as the first and second remote servers each have their own respective profile private key.

According to an embodiment, the step b"2 carries out a hash-based message authentication code (HMAC) to compute the verification token.

According to an embodiment:
the device side secure element data comprising a secure element secret key,
the server side secure element data comprising the secure element secret key, wherein:
the step b- comprises a step b'''1 of computing the device key material being a device shared secret based on the secure element secret key and at least a part of the device side profile data the step d- comprises, after the step c- of reporting the association to the remote server:
a step d'''1 of retrieving among the image data and from the reported association: at least the secure element secret key and the profile data corresponding to the device side profile data used at the step b'''1,
a step d'''2 of computing the server key material being a server shared secret based on the secure element secret key and the part of the device side profile data retrieved at step d'''1.

According to the above embodiment, the secure element secret key is stored on device side and on remote server side, before the association. Typically, the image data on the server side comprises several secure element secret keys, and several sets of profile data. After association, the device can compute the device shared secret, and after reporting the association of a given secure element and a given device with a given set of profile data, the remote server can also compute the server shared secret, but there is no exchange of the secure element secret key during the step of reporting the association. Therefore, the step of reporting the association does not need to be highly secured, as on device side and server side, the respective shared secrets are computed stored locally.

In other words, the above aspect is a method for securing a communication between a remote server and a device equipped with a secure element,
profile data being embedded in said device,
secure element public ID and secure element secret key being embedded in said secure element,
image data comprising a copy of the profile data, a copy of the secure element public ID and a copy of the secure element secret key being stored on the remote server,
the method comprising the steps consisting in:
sending to the remote server the secure element public ID associated with at least one part of the profile data,
generating, on the device side, a device shared secret based on the secure element secret key and at least one part of the profile data,
authorizing a communication between the remote server and the device after an authentication executed at least on the basis of a comparison between the device shared secret and remote data which are retrieved among the image data on the basis of the sent secure element public ID associated with at least one part of the profile data.

According to the above method, there is a step of computing and/or storing the shared secret on the device side, with the secure element secret key (available because the secure element is embedded in the device) and at least one part of the profile data (made available in the device). That is to say that the shared secret is computed and/or stored either by/within the secure element itself (actually coupled or inside with the device) or by/within hardware of the device being distinct from the secure element. There is also a separate and distinct step of retrieving remote data from the image data on the remote server side, also with the secure element public ID (copy available on the remote server as it is the server of secure element supplier or manufacturer, or supplied to the remote server by the secure element supplier or manufacturer) and at least one part of the profile data (copy available in the remote server as it is the server of the device manufacturer, or supplied to the remote server by the device manufacturer). These two distinct steps might be simultaneous, or executed sequentially in any order, it is simply needed to perform these two steps before any communication between the device and the remote server. Indeed, to enable a secured communication between the device and the remote server, the device shared secrets and the remote data (retrieved from the image data stored on the remote server) are needed to allow a comparison. This comparison ensures that the device is embedded with an official secure element if the device shared secret generated on the device matches the remote data generated/retrieved on the remote server side. It has to be noted that the mentioned comparison is the minimum step of the method, and may comprise basic and direct comparison, but may also include other authentication schemes, and/or additional secured steps such as hash function . . . .

According to an embodiment:
device side profile data being embedded in said device comprises device side public profile data directed to a single user, and a profile secret key, and wherein the generation of the device shared secret is executed with the profile secret key. Only secret data is used to generate the device shared secret.

According to an embodiment:
device side profile data embedded in said device comprise device side public profile data, directed and common to a set of profiles or users, and a single profile secret key associated to the public profile data, and wherein the generation of the device shared secret is executed with the single profile secret key. Only secret data is used to generate the device shared secret which is in the present case common to the set or profiles or users. Indeed, the public profile data in this case belongs or represents a plurality of profiles or users, which can then be retrieved through the single profile data.

According to an embodiment:
the server shared secret is generated with:
the secure element secret key retrieved among the image data, and
the profile secret key retrieved among the image data.

According to an embodiment, the method comprises, before the step e- of authorizing the communication between the remote server and the device, a step of validating the association, on the remote server side, with at least a step of checking absence of multiple identical associations. This preliminary step ensures that there is no clone/duplication of device, secure element or profile data.

In particular, the method comprises, before the step of authorizing the communication between the remote server and the device, a step of validating, on the remote server side, the association of the received secure element public ID with at least one part of the profile data, with at least a step of checking absence of multiple associations including a same secure element public ID and/or same profile data.

According to an embodiment, the step of generating the server key material, on the remote server side, is executed only if the reported association of said part of device side profile data and said part of the device side secure element data, is validated as unique. This embodiment strengthens the authentication, as in case of second or multiple association, no shared secret at all is generated, so that there is no risk of allowing any communication.

Further, in case of detection of multiple associations and/or detection of suspicious first association, the first generated or registered or recognized association is invalidated, and the generated server key material or server shared secret is revoked and/or deleted. Thus, with such step, the server database is "cleaned" every time of detection of clone or suspicious association, so as to avoid any communication with non fully trusted device/association.

According to an embodiment:
embedding device side profile data in said device, and/or embedding device side secure element data in said secure element, is/are performed before the step of associating the secure element to the device. According to this embodiment, the secure element manufacturing can be distinct from the device manufacturing, and the secure element might be manufactured with specific security standards, for example of higher degree than the security level of manufacturing the device.

According to an embodiment, the step e- of authorizing the communication comprises:
a step of sending, to the remote server, the device key material and a step of comparison, executed on the remote server side, the received device key material with the server key material, and/or
a step of sending, to the device, the server key material and a step of comparison, executed on the device side, the device key material with the received server key material.

A second aspect of the disclosure relates to a system comprising:
a device embedding device side profile data,
a secure element embedding device side secure element data,
a remote server storing image data comprising:
server side profile data (SSPD) being stored in the remote server,
server side secure element data (SSSED) being stored in the remote server, or being retrievable from the remote server, the system being arranged to implement the steps of the method for securing a communication of the first aspect of disclosure.

Other features and advantages of the present invention will appear more clearly from the following detailed description of particular non-limitative examples of the invention, illustrated by the appended drawings where.

Figure 1:
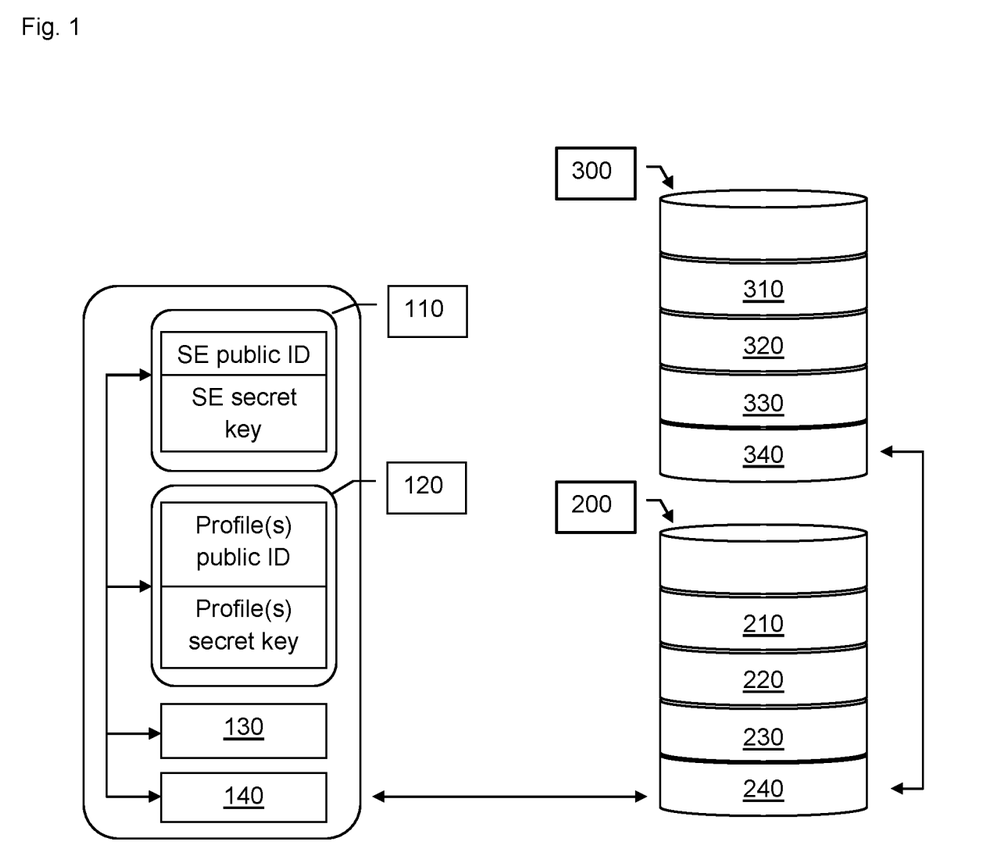
FIG. 1 represents a system comprising a device, a secure element embedded in the device, a first remote server and a second remote server, the device being arranged to implement an aspect of the method according to the invention for securing a communication between the remote server and the device, based on symmetric cryptography.

FIG. 1 represents a system comprising a device 100, a first remote server 200 and a second remote server 300, the device 100 being arranged to implement an aspect of the method according to the invention for securing a communication between the first remote server 200 and the device 100, based on symmetric cryptography.

The device 100 is intended to provide services to a user, in particular services enriched by a communication between the device 100 and the first remote server 200, and as an example, the device 100 might be a telephone, a smartphone, a smart speaker, a connected medical device, a smart TV . . . . As an example, the first remote server 200 belongs to a service provider, possibly being an internet service provider, or a communication provider or a remote service provider such as an entertainment content provider, or a medical care provider . . . .

The device 100 is designed and manufactured to communicate at least with the first remote server 200. In this aim, the device 100 comprises a device communication unit 140, and a device control unit 130 for controlling the device 100. Similarly, the first remote server 200 is equipped on its side with a first remote server communication unit 240, and with a first remote server control unit 230.

An important point to consider is to provide a secured communication between the device 100 and the first remote server 200, so as to ensure that the device 100 is an official and recognized device (to avoid communication with unauthorized clones and/or emulated devices, unexpected data copy or loss . . . ), before allowing communication between the device 100 and the first remote server 200.

In this aim, the system carries out a method based on symmetric cryptography. In particular, the device 100 comprises a device secure element section 110 (which can be simply said to be a secure element) storing data comprising at least a secure element public ID, and a secure element secret key. The device 100 also comprises a device profile data section 120 storing data comprising at least a profile public ID, and a profile secret key. The device profile data section 120 might well store multiple profiles data. The device secure element section 110 might be provided as a system on chip, or might be directly embedded in the device control unit 130, or in another section of the device 100.

Similarly, the first remote server 200 comprises a first remote server secure element section 210 storing data comprising at least the secure element public ID, and the secure element secret key. The first remote server 200 comprises a first remote server profile data section 220 storing profile data comprising at least the profile public ID, and the profile secret key.

Typically, as the first remote server 200 is belonged by the service provider:
the first remote server secure element section 210 stores data related to all the secure elements: all the secure element public ID, and all the secure element secret key generated;
the first remote server profile data section 220 comprises all the profile data comprising all the profile public ID, and all the profile secret key generated.

As will be detailed here under, an advantageous option is that the secure element section 110 is manufactured/provided by a secure element provider, possibly distinct from the service provider, and then, a second remote server 300 is provided at the secure element provider. In the given example, the second remote server 300 presents the same architecture than the first remote server 200, and comprises:
a second remote server secure element section 310 storing data comprising at least the secure element public ID, and the secure element secret key stored on the secure element section 110 of the device 100;
a second remote server profile data section 320 storing profile data comprising at least the profile public ID, and the profile secret key stored on the device 100;
a second remote server communication unit 340;

a second remote server control unit 330.

Of course, the data stored on the first remote server 200 and/or on the second remote server 300 might well be updated each time a new secure element/profile is created. As shown FIG. 1, communications might be established between the first remote server 200 and the second remote server 300.

Finally, it should be noted that only one remote server can be provided in the system, that is to say that all the data is stored in a single location/server. Alternatively, it might also be that the first remote server 200 and/or the second remote server 300 is segmented in sub units not necessarily located at a same location.

Figure 2:
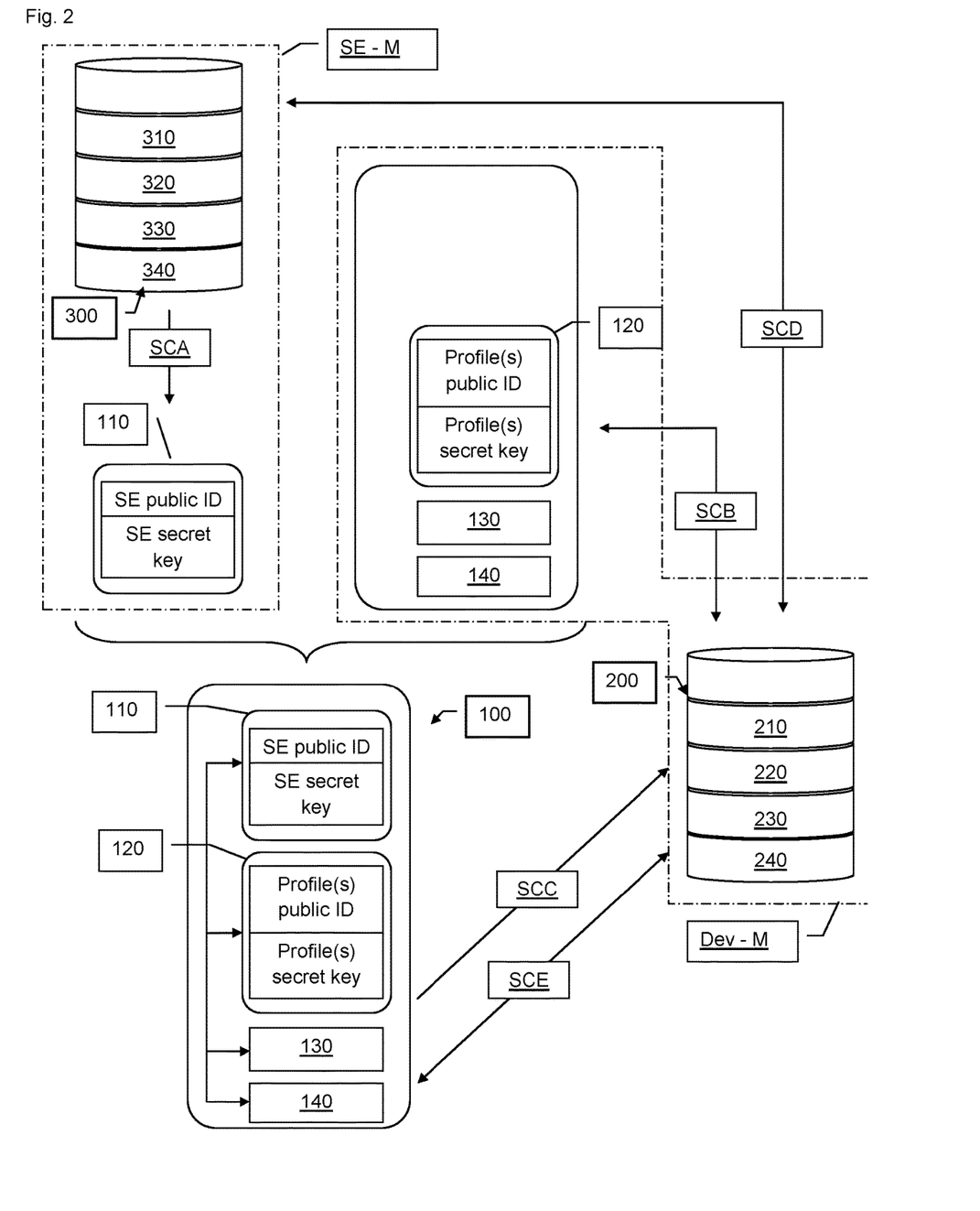
FIG. 2 represents a diagram showing the links and actions between the elements of the system of FIG. 1.

To provide a secured communication between the device 100 and the first remote server 200, a specific method is provided, with the steps represented FIG. 2 illustrating the manufacturing of the device 100 and coupling to its device secure element section 110 and data exchange with the first and second remote servers.

In detail of the present case, the device secure element section 110 is manufactured and/or programmed by a secure element provider, in a specific plant SE-M. Accordingly, during a step SCA, the device secure element section 110 is loaded with a unique secure element public ID, and with a unique secure element secret key, initially stored/generated in the second remote server 300, specifically in the second remote server secure element section 310. Specific security standards can be applied to this step, to ensure that generation/storage of the secure element data are correctly managed. Then, the secure element section 110 (the "secure element") can be sent to the supply chain of the device 100.

In the given example of FIG. 2, the device 100 is manufactured and/or programmed at a service provider plant Dev-M. At a step SCB, the device profile section 120 of device 100 is loaded with profile data, that is to say with profile(s) public ID and with profile secret key(s), initially generated and/or stored on the first remote server 200. The device secure element section 110 is also coupled or integrated into the device 100 at the service provider plant Dev-M, to end with a complete device 100, as shown in the bottom part of FIG. 2.

In the above given example, the secure element section 110 is typically a system on chip (SoC), so as to be easily sent (as a "secure element") to the device manufacturer. However, the secure element section 110 might be an integral part of the hardware of the device 100, and in such a case, the step SCA is executed on the full device 100.

Once the device 100 is complete, two steps can be executed. On one side, the device 100 (for example the device control unit 130) can generate and/or compute a device shared secret, from the secure element secret key (available at the device level) and the profile secret key (also available at the device level), using a Key Derivation Function (KDF).

On the other side, at a step SCC, the device 100 (via the device communication unit 140) can send to the first remote server 200 the secure element public ID, and the profile public ID. To strengthen the security, a step SCD is performed, to check if the secure element public ID, and/or the profile public ID have already been used. In this step SCD (illustrated by the double arrow between the first remote server 200 and second remote server 300), the first remote server 200 checks if one or the other of the received secure element public ID, and the profile public ID have already be submitted to the first remote server 200 and/or to the second remote server 300.

If there is no duplication/clone, then the first remote server 200 retrieves/generates/computes on its side remote data from the data stored on the first remote server 200. Typically, a server shared secret is generated/computed, using the secure element secret key (retrieved and available at the first remote server 200 side from the first remote server secure element section 210, with the received secure element public ID) and the profile secret key (also retrieved and available at the first remote server 200 side from the first remote profile data section 220, with the received profile public ID), using the same Key Derivation Function (KDF) as the device 100 used.

Once the device and server shared secret are independently generated on both sides, a communication at step SCE can be secured by comparing the shared secrets, on the device 100 side, or on the first remote server 200 side, or on both sides, before exchanging data for example.

With the above method, there is no need to dynamically link the secure element manufacturing/programming line and the device 100 manufacturing/programming line. Thus, the supply chain remains simple, and the communication is still secured.

Figure 3:
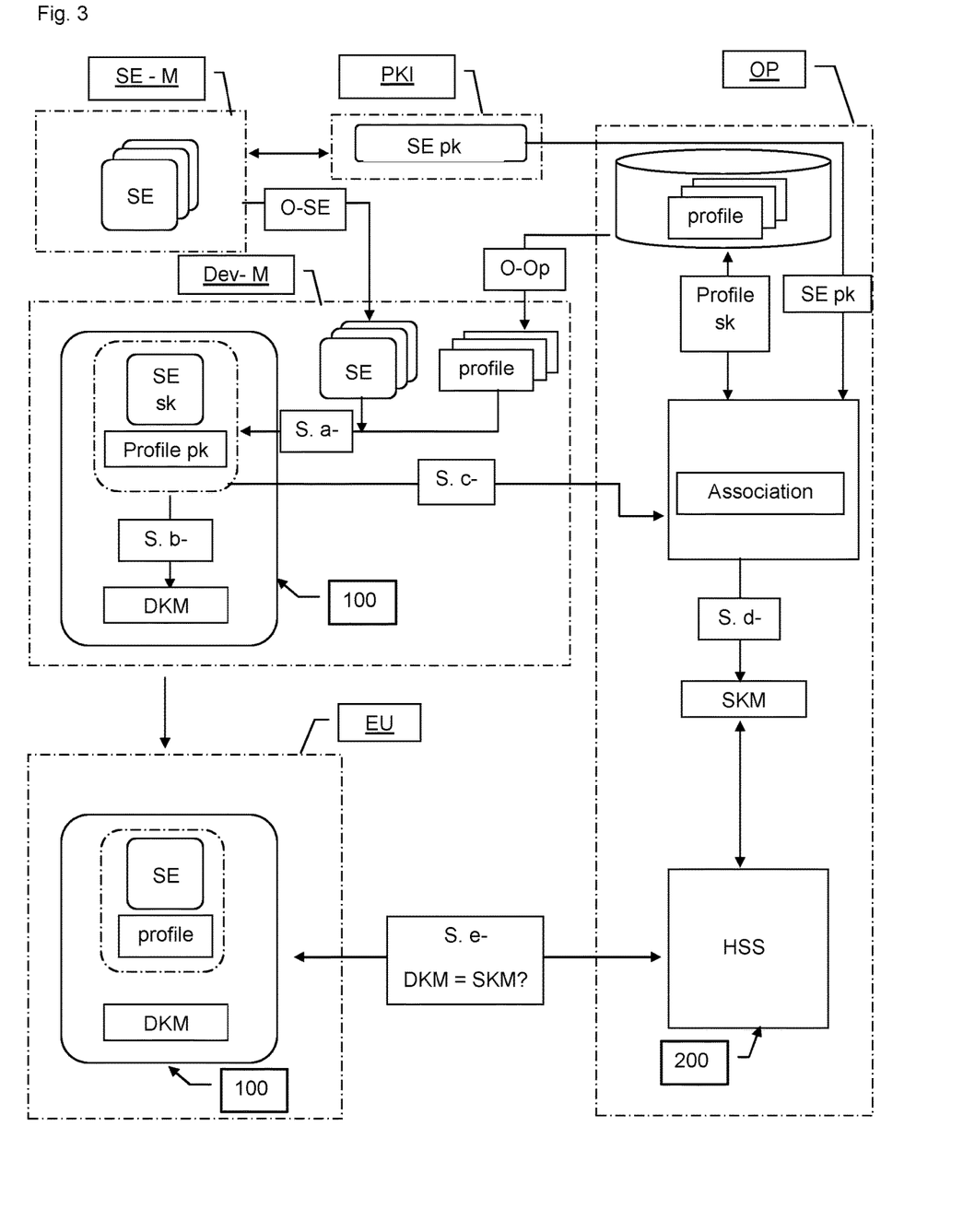
FIG. 3 represents another system, in which a device is manufactured by a device manufacturer, where a given secure element is associated to a given device storing given profile data, the association being reported to an operator, the system being arranged to implement another aspect of the method according to the invention for securing a communication between a remote server of the operator and the device, based on asymmetric cryptography.

FIG. 3 represents another system, which is similar to the above system of figure, but implementing a method based on asymmetric cryptography to secure the communication between the device 100 and first remote server 200 hosted by an operator OP.

In the system of FIG. 3, a device manufacturer Dev-M can order to a secure element manufacturer SE-M at a step O-SE a batch of secure elements SE. Each secure element SE, typically a System on Chip (SOC), typically stores device side secure element data, typically comprising device side secure element private data (a private key), and device side secure element public data (such as a secure element ID, and/or a secure element public key, and/or a secure element public key certificate . . . ). In summary, the device side secure element data embedded in the secure element SE comprise private or secret data (noted "SE sk" on FIG. 3), and public data (noted "SE pk" on FIG. 3).

The secure element private data is typically kept and stored by the secure element manufacturer SE-M, who can also send or share the secure element public data with a public key infrastructure PKI.

To supply a device 100 capable to provide services to a end user EU, the device manufacturer Dev-M can order to an operator OP at a step O-Op a batch of profiles. Each profile on the device side is defined by (or comprises) device side profile data, and said device side profile data typically comprise device side public data, such as: profile public ID, and/or profile public key, and/or profile public certificate. In summary, on the device side, profile data comprise only public data. In parallel, the operator OP keeps on his side server side profile data, which includes the sent profile public data (noted "profile pk" on FIG. 3), but also profile private data, a profile private key (noted "profile sk" on FIG. 3), which is kept on operator or server side.

During manufacturing of the device 100, the device manufacturer picks out one secure element from the batch of secure elements SE, and one profile from the batch of profiles, to associate them at a step a- ("S. a-" on FIG. 3) into the given device 100. One should be note that the association might be done as well at the end user UE side in some cases.

Once this association is done, two steps "S. b-" and "S. c-" can be carried out on he device side, in any order or simultaneously.

A Step b- ("S. b-" on FIG. 3) of generating Device Key Material DKM is executed by the Secure Element SE. In detail, a device shared secret is computed using at least the device side secure element private data, and a part of the device side profile data. For example, the device shared secret can be computed using the secure element private key and the profile public key. This device shared secret is stored into a memory of the device 100 as Device Key Material DKM.

A Step c- ("S. c-" on FIG. 3) of reporting the specific association to the operator can be done by the device manufacturer Dev-M (this reporting step c- might be done by the device itself as well when in the hands of the end user EU). During this step c-, the association is reported by sending only public data from the secure element SE and public data from the profile. That is to say that at step c-, all or part of the secure element ID, and/or secure element public key, and/or secure element public key certificate, and all or part of profile public ID, and/or profile public key, and/or profile public certificate is sent to the operator OP to report the association of the given secure element Se with the given profile into the given device 100. No private or secret data is sent during this step c-, so that there is neither need to secure this communication nor need to keep a constant dynamic link with the entities.

Once the association is reported with public data, the operator OP can:
retrieve the private profile data of the given profile from his own source, and
authenticate and/or retrieve the secure element public data of the given secure element SE from a trusted source.

In this aim, a request can be sent from the remote server to a Public Key Infrastructure to authenticate the data related to the secure element received and/or a communication can be established with the public key infrastructure PKI, so as to receive in return an authentication of the data related to the secure element from the Public Key Infrastructure, identified with the association data received during the step c-. Alternatively, a request can be sent from the remote server to a Public Key Management Authority to retrieve the public key or certificate of the given secure element SE, identified with the association data received during the step c-. This data authenticated or retrieved from step of connection to the PKI or Public Key Management Authority can be trusted, and used to generated server key material SKM. One should note that the sending of the request or connection to a PKI is easy, standard and fast, but alternatively one can encompass the direct connection between the operator OP and secure element manufacturer SE-M to retrieve the secure element public data in a secure manner.

At this stage, the operator has in hands the profile private data of the given profile and the secure element public data of the given secure element SE, so that a server key material SKM can be generated. In detail, the server key material SKM is a server shared secret, and can be computed with the profile private key and the secure element public key. This server key material SKM can be stored in the first remote server 200, which can be in the present example a Home Subscriber Server HSS hosted by the operator OP.

At this stage, the device key material DKM has been computed by the secure element SE on the device 100 side, the server key material SKM has been computed on the remote server 200 side, so that a step e- (S. e- on FIG. 3) of authorizing a communication between the device 100 and the remote server 200 can occur. Typically, the step e- carries out a comparison (on the device 100 side, or on the remote server 200 side) between the device key material DKM and the server key material SKM. Of course, a check for clones/duplicated associations can be carried out as well.

One can notice from the above that:
the reporting step c- is performed without sending any private data, which waives the need to have secure communication between the device manufacturer and the operator
the device key material is computed by the secure element with a secure element private key, this ensures a high level of security;
the server key material is computed by the operator with a profile private key, this ensures a high level of security;
the server key material is computed by the operator with a secure element public key retrieved from a PKI, this ensures a high level of flexibility, while still providing a high level of security.

Figure 4:
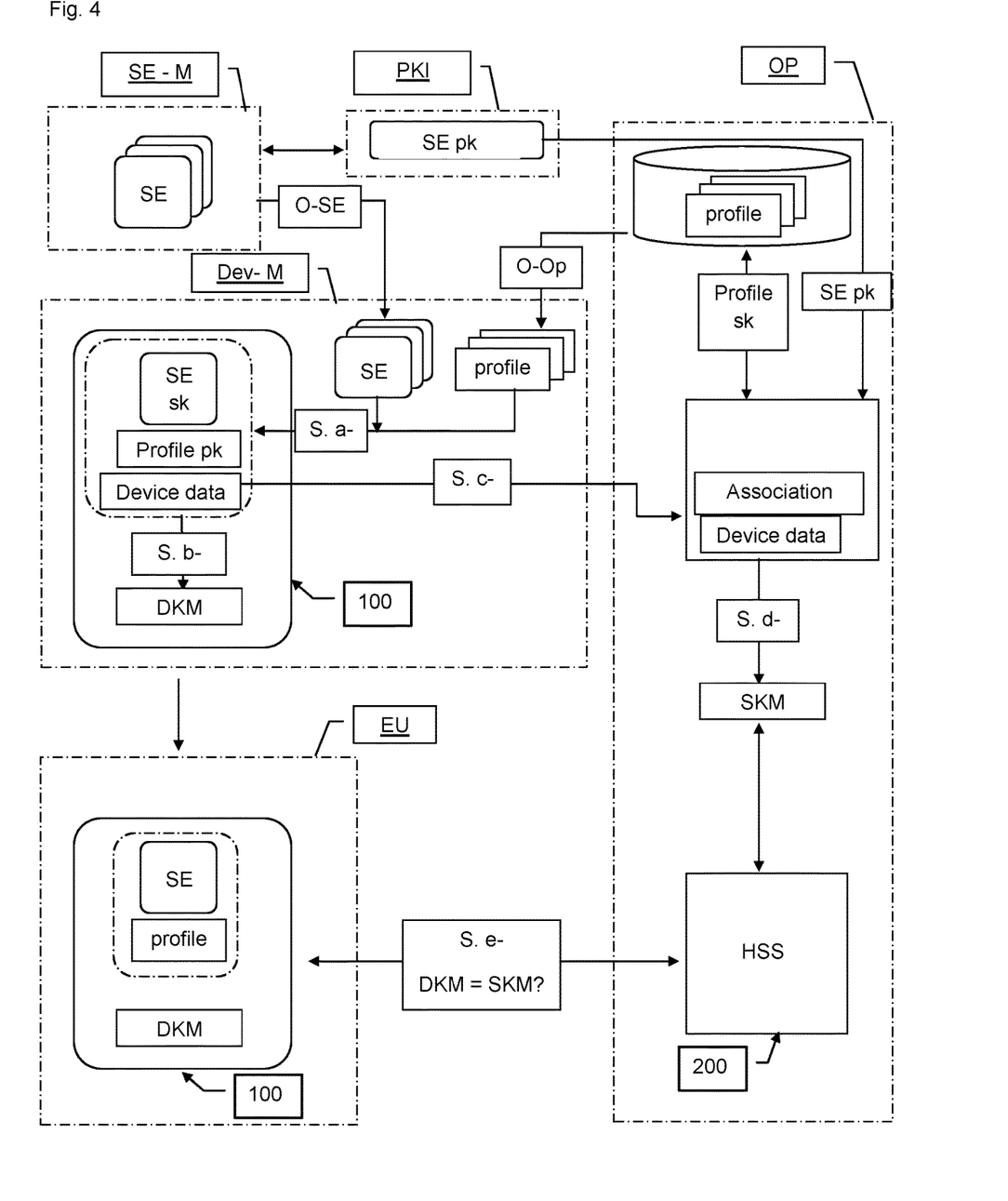
FIG. 4 represents an alternative system to the system of FIG. 3, still based on asymmetric cryptography.

FIG. 4 represents a system which is an alternative of the above described system of FIG. 3. Only the differences are described in the following.

On addition to the process described at the device manufacturer Dev-M side, it might be useful or necessary to generate some specific data to store them into the device 100. These device manufacturer data (shown as "device data" onto FIG. 4) can be used in an implicit authentication scheme. Indeed, at step b- of FIG. 4, the secure element SE computes for example a device shared secret based on the secure element private key, the profile public key and onto the device manufacturer data. For example, the device shared secret can be the output of a key derivation function KDF having the secure element private key, the profile public key and the device manufacturer data as input. The device shared secret is considered as the device key material DKM. One might also consider possible to generate multiple keys, generated from the association and different type of device manufacturer data (triple association between secure element, operator profile and manufacturer data for example).

The step c- of reporting the association still reports the secure element public data and the profile public data of the association, but also reports the device manufacturer data.

On this basis, the operator OP can compute a server shared secret based on the secure element public key (retrieved or authenticated from a PKI) and the profile private key, as in the method described at FIG. 3. However, mirroring the situation in the device 100, the operator OP, on the first remote server 200 side, computes the server shared secret, using the same key derivation function KDF than device 100, having also the device manufacturer data as input. The server shared secret is considered as the server key material SKM Then, the step e- can be similar to FIG. 3, authorizing the communication, by positive comparison of the device key comparing the server key material SKM to the device key material KDM.

Compared to the system of FIG. 3, the system of FIG. 4 allows to generate specific device manufacturer data during the manufacturing of the device 100, to send it to the operator, but still ensuring a high level of security, as the device manufacturer data is part of the second shared secret.

Figure 5:
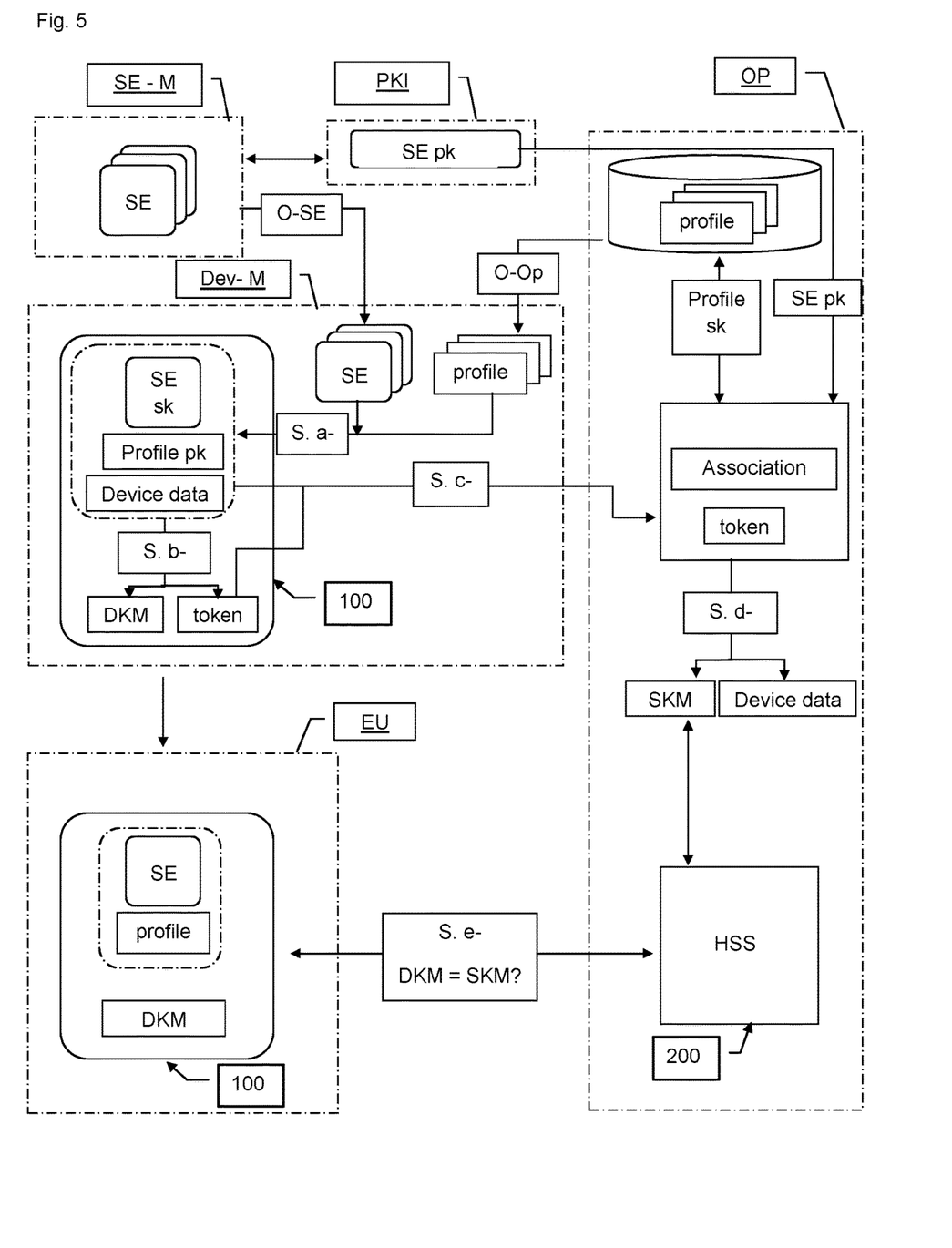
FIG. 5 represents an alternative system to the system of FIG. 4, still based on asymmetric cryptography.

FIG. 5 represents an alternative system to the system of FIG. 4, still based on asymmetric cryptography. In this system, instead of embedding the device manufacturer data into the device key material and server key material, it is decided to send the device manufacturer data to the operator during the step c- of reporting the association, still providing a high level of security.

In detail, the device manufacturer data (represented as "device data" in FIG. 5) is stored into the device 100. The step b- comprises a step of computing the device key material DKM being a device shared secret using the secure element private key and the profile public key. At this stage, the secure element SE (or the device 100) can compute a verification token as follows: a hash-based message authentication code (HMAC) can be carried out on the device manufacturer data and the result of a key derivation function (KDF) applied to the device shared secret.

During step c-, the secure element public data and the profile public data defining the association are still reported to the operator OP, but the verification token (represented as "token" in FIG. 5) is also sent to the operator OP.

Then, the operator OP, on the remote server side can still retrieve the secure element public key from the PKI, and can compute the server key material being a server shared secret, from the secure element public key and the profile private key. Once this is done, the operator can also retrieve the device manufacturer data from the verification token also received, using the same hash-based message authentication code (HMAC) and the same key derivation function (KDF). As the verification token has been computed on the device side on the basis of the profile public key, the security is ensured on the operator side as well (as the profile private key is available).

Then, the operator can trust the device manufacturer data, to adjust enrich, define for example a level of service. The step e-, as for FIGS. 3 and 4, authorize a communication between the device 100 and the first remote server 200 on the basis of a positive match between the device key material DKM and the server key material SKM.

Compared to the system depicted at FIG. 4, the system of FIG. 5 allows to carry out authorizing of a communication with device and server key material of low size as being computed with the secure element private or public key and the profile public or private key, even if the device manufacturer data generated by the device manufacturer is of extended size. Meanwhile, the device manufacturer data is send in a securely manner, in the form of a verification token, which can be trusted by the operator, to achieve an explicit data verification.

In all the cases described above, with symmetric or asymmetric keys, it is to be noted that the communication can be authorized after comparison of the device key material and the server key material, and does not need any of one time password, challenge-response, user ID-password encryption based mechanisms. Indeed, as the device key material and the server key material are both computed on each side (the device 100 and remote server 200) using secret data (either the secure element secret key in the symmetric case or the secure element or profile private key), these elements (device key material and the server key material) can be trusted for authorizing any further communication. In other words, after the step c- of reporting the association, any further communication is done by comparing the device key material and server key material, preferably without prior checking of validity of IMSI or IMEI numbers or the use of the association during the aka process.

It is of course understood that obvious improvements and/or modifications for one skilled in the art may be implemented, still being under the scope of the invention as it is defined by the appended claims.

The invention claimed is:

1. A method for securing a communication between a remote server and a device equipped with a secure element, device side profile data being stored in at least one of the device or the secure element, device side secure element data being stored in the secure element, wherein image data includes server side profile data being stored in the remote server, and server side secure element data being stored in the remote server, or being retrievable from the remote server, the method comprising:
   associating the device with the secure element,
   generating device key material based on the device side profile data and the device side secure element data, wherein the device side profile data includes device side profile public data and the device side secure element data includes device side secure element public data and device side secure element private data, the device side profile public data consists essentially of at least one of a profile public ID, a profile public key or a profile public certificate, and the device side secure element public data consists essentially of at least one of a secure element public ID, a secure element public key or a secure element public key certificate,
   reporting the association to the remote server, by sending, to the remote server, only a part of the device side profile public data and only a part of the device side secure element public data,
   generating server key material based on the server side profile data and the server side secure element data, retrieved from the image data from the reported association, and
   authorizing a communication between the device and the remote server, after an authentication based at least on a comparison between the device key material and the server key material,
   wherein the server side profile data is stored in the remote server before the association of the device and the secure element, and
   the server side secure element data is stored in the remote server before the association of the device and the secure element or is retrievable from the remote server before the association of the device and the secure element.

2. The method according to claim 1, wherein the device side profile data comprises the profile public key,
   the device side secure element private data comprises a secure element private key, wherein the step of generating the server key material further comprises, after the step of reporting the association to the remote server:
   sending a request from the remote server to a Public Key Infrastructure to authenticate the data related to the secure element received at the reporting step, or sending a request from the remote server to a Public Key Management Authority to retrieve at least one of a secure element public key or a secure element public key certificate related to the data related to the secure element received at the reporting step, and
   receiving an authentication of the data related to the secure element from the Public Key Infrastructure, or retrieving from the Public Key Management Authority and storing into the remote server at least one of the secure element public key or the secure element public key certificate.

3. The method according to claim 2, wherein the server side profile data comprises a profile private key,
   the device key material is a device shared secret generated with the profile public key and the secure element private key, and
   the server key material is a server shared secret generated with the profile private key and at least one of the secure element public key or the secure element public key certificate retrieved at the retrieving step.

4. The method according to claim 3, wherein:
the associating step further comprises, after associating the device with the secure element, generating or installing device manufacturer data and storing said device manufacturer data into the device,
the step of generating the device key material further comprises computing at least one device shared secret taking as input the secure element private key, the profile public key, and the generated device manufacturer data,
the step of reporting the association includes reporting the device manufacturer data, while the device shared secret remains stored in the device as the device key material, and
the step of generating the server key material further comprises computing the server key material based on at least one of the received device manufacturer data, the profile private key, the secure element public key or the secure element public key certificate.

5. The method according to claim 4, wherein the step of computing the at least one device shared secret comprises performing a Key Derivation Function (KDF) to compute the device shared secret.

6. The method according to claim 3, wherein:
the associating step further comprises, after associating the device with the secure element, generating device manufacturer data and storing said device manufacturer data into the device,
the step of reporting the device key material further comprises:
computing the device shared secret, and
computing a verification token taking as input to the computed device shared secret and the generated device manufacturer data, and
the step of reporting the association includes reporting the verification token, while the device shared secret remains stored in the device.

7. The method according to claim 6, wherein the step of computing the verification token further comprises performing a hash-based message authentication code to compute the verification token.

8. The method according to claim 1, wherein
the device side secure element data comprises a secure element secret key,
the server side secure element data comprises the secure element secret key,
the step of generating the device key material further comprises computing the device key material being a device shared secret based on the secure element secret key and at least a part of the device side profile data, and
the step of generating the server key material further comprises, after the step of reporting the association to the remote server:
retrieving among the image data and from the reported association: at least the secure element secret key and profile data corresponding to the computed device side profile data, and
computing the server key material being a server shared secret based on the secure element secret key and the part of the retrieved device side profile data.

9. The method according to claim 8,
wherein the device side profile data embedded in said device comprises the device side public profile data, which is directed to a single user, and a profile secret key, and
wherein the generation of the device shared secret is executed with the profile secret key.

10. The method according to claim 9, wherein the server shared secret is generated with:
the secure element secret key retrieved from the image data, and
the profile secret key retrieved from the image data.

11. The method according to claim 8,
wherein the device side profile data embedded in said device comprises the device side public profile data, which is directed and common to a set of profiles or users, and a single profile secret key associated to the public profile data, and
wherein the generation of the device shared secret is executed with the single profile secret key.

12. The method according to claim 1, further comprising, before the step of authorizing the communication between the remote server and the device, validating the association, on the remote server side, with at least a step of checking absence of multiple identical associations.

13. The method according to claim 12, wherein the step of generating the server key material is executed only if the reported association of said part of the device side profile data and said part of the device side secure element data, is validated as unique.

14. The method according to claim 1, wherein at least one of embedding the device side profile data in said device, or embedding the device side secure element data in said secure element, is performed before the step of associating the secure element to the device.

15. The method according to claim 1, wherein the step of authorizing the communication further comprises at least one of:
sending, to the remote server, the device key material and comparing, executed on the remote server side, the received device key material with the server key material, or
sending, to the device, the server key material and comparing, by the device, the device key material with the received server key material.

16. The method according to claim 15, further comprising:
receiving the secure element embedding the device side secure element data,
loading a device profile section of the device with the device side profile data, and
coupling the secure element to the device.

17. The method according to claim 16, further comprising at least one of generating or computing the device key material based on the device side profile data and the device side secure element data.

18. The method according to claim 16, further comprising reporting, to the remote server, the association resulting of the coupling of the secure element to the device, by sending, to the remote server, only the part of the device side profile public data and only the part of the device side secure element public data.

19. A system, comprising:
a device equipped with a secure element and embedding device side profile data,
the secure element embedding device side secure element data, and
a remote server storing image data comprising:
server side profile data and server side secure element data,
wherein the system further comprises circuitry configured to associate the device with the secure element, the device includes device circuitry configured to generate device key material based on the device side profile data and the device side secure element data, wherein the device side profile data includes device side profile public data and the device side secure element data includes device side secure element public data and device side secure element private data, the device side profile public data consists essentially of at least one of a profile public ID, a profile public key or a profile public certificate, and the device side secure element public data consists essentially of at least one of a secure element public ID, a secure element public key or a secure element public key certificate, the device circuitry is further configured to report the association to the remote server, by sending, to the remote server, only a part of the device side profile public data and only a part of the device side secure element public data, the remote server includes server circuitry configured to generate server key material based on the server side profile data and the server side secure element data, retrieved from the image data from the reported association, and at least one of the server circuitry or the device circuitry is further configured to authorize a communication between the device and the remote server, after an authentication based at least on a comparison between the device key material and the server key material, wherein the server side profile data is stored in the remote server before the association of the device and the secure element, and the server side secure element data is stored in the remote server before the association of the device and the secure element or is retrievable from the remote server before the association of the device and the secure element.

* * * * *